J. F. WHITING.
PLOW.
APPLICATION FILED JAN. 10, 1911.
991,810.
Patented May 9, 1911.
2 SHEETS—SHEET 1.
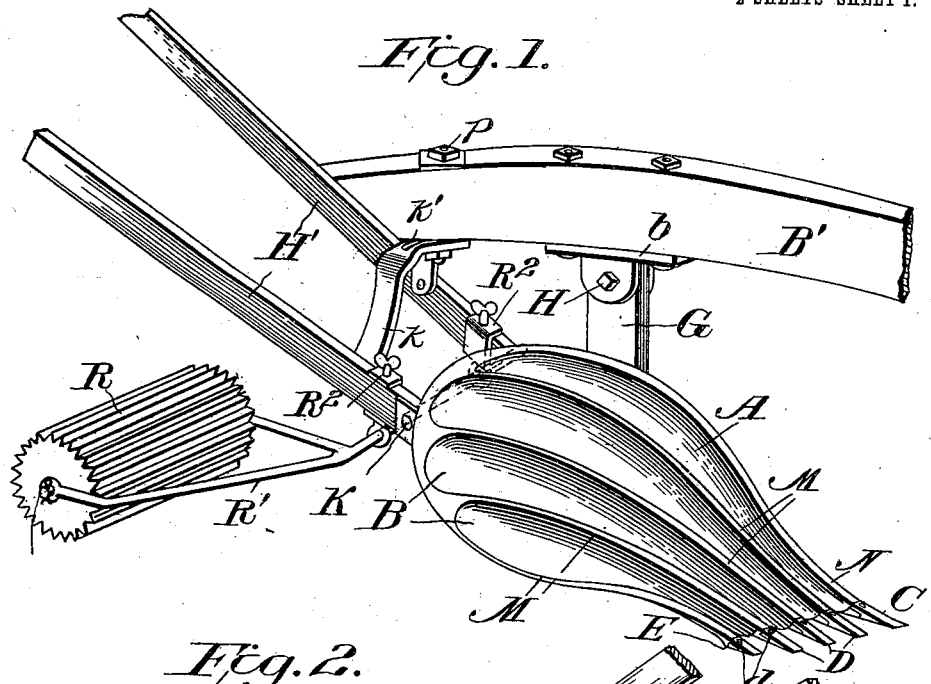
Fig. 1.
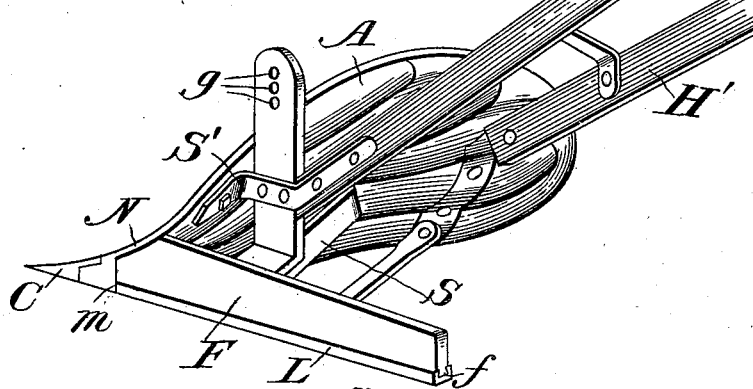
Fig. 2.
Fig. 3.
Witnesses
C. N. Walker.
James B. Mansfield.
Inventor
James F. Whiting
By Alexander P. Browell
Attorneys J. F. WHITING.
PLOW.
APPLICATION FILED JAN. 10, 1911.
991,810.
Patented May 9, 1911.
2 SHEETS—SHEET 2.
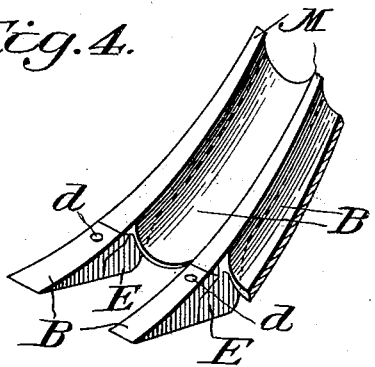
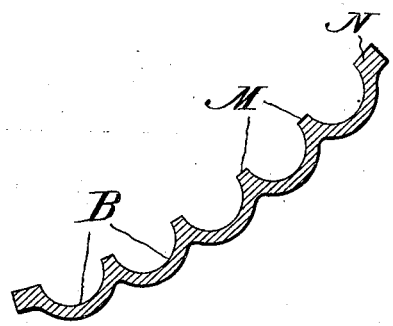
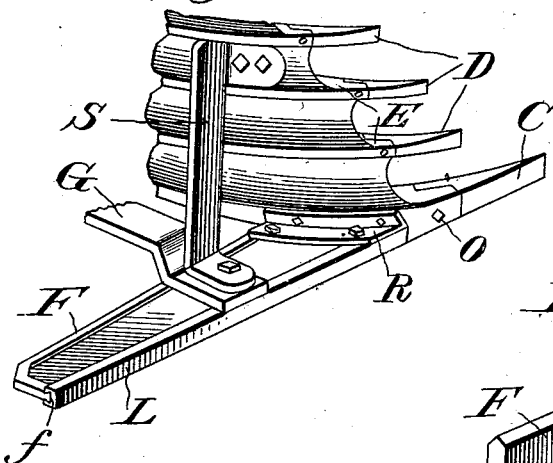
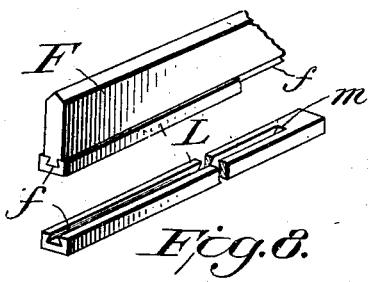
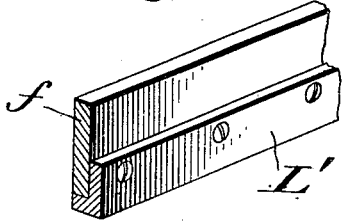
Witnesses
Inventor
Junius F. Whiting
By Alexander T. Dowell
Attorney

UNITED STATES PATENT OFFICE.

JUNIUS F. WHITING, OF SPRINGFIELD, OHIO.

PLOW.

991,810. Specification of Letters Patent. Patented May 9, 1911.

Application filed January 10, 1911. Serial No. 601,819.

*To all whom it may concern:*

Be it known that I, JUNIUS F. WHITING, of Springfield, in the county of Clark and State of Ohio, have invented certain new and useful Improvements in Plows; and I hereby declare that the following is a full, clear, and exact description thereof, reference being had to the accompanying drawings, which form part of this specification.

This invention is an improvement in plows and its object is to provide a plow with a novel mold-board so constructed that it will readily and easily turn a furrow and at the same time break up and pulverize or divide the earth as it is turned so that the furrows turned by said plow will be prepared ready for seeding. In other words instead of simply turning over a broad smooth unbroken strip of earth it will divide and break up such strip so that except in unusually stiff ground no subsequent harrowing will be necessary to reduce the earth to condition for seeding.

The invention consists in a mold-board having a series of raised ribs which diverge over the front and rear of the mold-board and are separated by channels or coves which gradually widen and decrease in depth from the front toward the rear of the mold-board for the purpose of reducing friction, and each rib is provided with a cutting point at its lower end which facilitates the operation of the rib in breaking the earth.

The mold-board is cast or made in one piece, and the ribs have polished surfaces and steel points for breaking the ground, and the coves or channels between the ribs reduce friction and assist in preparing the earth for seeding at the first plowing.

I will now describe the invention with reference to the accompanying drawings in which—

Figure 1 is a perspective view of part of a plow showing the furrow-side of the mold-board. Fig. 2 is a land-side view thereof. Fig. 3 is a detail perspective view of the plow point and adjacent rib points. Fig. 4 is an enlarged detail perspective view of part of the ribs. Fig. 5 is an enlarged transverse section through the mold-board. Fig. 6 is a detail view of the connection between the land-side guard and the mold-board. Figs. 7 and 8 are detail views of the steel shod land-side and guard. Fig. 9 is a similar view of a slight modification.

The mold-board A may have the general outline of any of the best forms of mold-boards now commonly used; but instead of being smooth-surfaced, as such boards usually are, it is provided on its face with a number of ribs M which extend substantially longitudinally of the mold-board from the front or cutting edge thereof to the top and rear edge thereof, (see Fig. 1). These ribs M have polished faces and are preferably narrowed or tapered toward their rear ends. Between these ribs are formed channels or coves B which are deep and narrow at the cutting edge of the mold-board, and then gradually become wider and shallower as they recede toward the rear edge of the mold-board; said coves practically merging into the surface of the mold-board at their rear ends to prevent clogging.

The mold-board has a land-side rib N which may be made thicker than the ribs M, and is provided at its front end with the usual steel point C which may be secured thereto in the usual manner by a bolt O. Each of the ribs M has a foot E at its front end, to which is attached a steel point D, similar to but smaller than the point C. The point D may be removably attached to the feet E of the ribs M by bolts $d$ or other suitable means. Any of these points C or D can be readily detached and replaced without taking the plow to the shop.

The number and width of the ribs M may be varied to suit the character of the work to be done and the form and general outline of the mold-board which as stated may follow the curves of any of the better mold-boards now in general use.

The feet E of the mold-board ribs strengthen the lower cutting edge of the mold-board where it has most work to perform, and afford substantial bases for the attachment of the points D. The land-side guard F may be engaged with a match groove $f$ on the shoe L as shown in Fig. 7, and have a lug stop $m$ at its front end so that the "steel shoe" can be replaced when worn. This part may be constructed as usual, and so may the standard G. To enable the beam B′ to be adjusted up or down the standard G is provided with a series of holes $g$ in its upper end either of which may be engaged by a bolt H attached to a bracket $b$ on the beam B′. The beam may be adjusted sidewise by means of a bolt $p$ adjustably engaged with a slot $k′$ in a bracket $k$ attached to one of the handle irons K, which are fastened to the mold board, and to which the handles H' are secured as usual. As stated the ribs M have gradually narrowing faces as they recede from the points D which gives them a better hold on the moving mass of broken ground ascending the mold-board and as they diverge the ground is torn to pieces as the furrow is turned.

The essential feature of the invention is the solid mold-board and share with divergent ribs having land breaking points firmly secured to the lower ends and separated by coves or channels B which have their lower edges made sharp for cutting into the broken earth intermediate the point D and which will facilitate the ascent of the ground and break and distribute the same as it ascends the mold-board.

By having the faces of the ribs gradually narrow toward their rear ends and the spaces or coves between them gradually widen and decrease in depth toward the rear edge of the mold-board, they can cut deeper into the mass of ascending earth and the earth will be torn to pieces and distributed in better shape for seeding, without clogging the board.

The mold-board may be connected to the land-side by a brace S and the angle plate R as indicated in the drawings. The angle plate R may be attached at one end to the mold-board at the base of the standard G, and an additional brace S' may be arranged between the standard G and the mold-board as indicated in the drawings. These connections between the standard the beam and the mold-board and the land-side may be varied to suit the constructor and the form of plow to which the invention is applied, as the invention resides more particularly in the construction of the mold-board.

The separated soil when cast off the plow is well distributed and ready for planting. A cylindrical crushing or pulverizing roll may be attached to the plow as shown at R in Fig. 1, such crushing roll passing over the soil leaves it in more perfect condition for various kinds of small garden and farm seeding. This crushing roll may be attached to the plow by means of brackets R² attached to the handles H' and in which are mounted a shaft, one end of which is attached to rods R' to which the shaft of the roller R is connected. Such crushing roller can thus be adjustably attached to the plow, so as to follow directly after the mold-board and roll the soil turned thereby. This cylindrical crusher takes the place of a harrow but does not bring the sod to the top and covers it effectually so that the sod is left well under the surface and will act as a fertilizer.

What I claim is:

1. A mold-board having its outer surface provided with a series of longitudinally disposed diverging ribs extending from its cutting edge toward the rear edge thereof, and channels or coves between said ribs gradually decreasing in depth and increasing in width from the cutting edge of the mold-board toward the rear edge thereof.

2. A mold-board having its outer surface provided with a series of longitudinally disposed diverging ribs extending from its cutting edge toward the rear edge thereof, said ribs gradually narrowing in width from the cutting edge to the rear of the mold-board, and channels or coves between said ribs gradually decreasing in depth and increasing in width from the cutting edge of the mold-board toward the rear thereof.

3. A mold-board having its outer surface provided with a series of longitudinally disposed diverging ribs extending from its cutting edge toward the rear edge thereof, the lower ends of said ribs having thickened portions or feet, and channels or coves between said ribs gradually decreasing in depth from the cutting edge of the mold-board toward the rear thereof; with steel cutting points detachably attached to the feet of the ribs.

4. A mold-board having its outer surface provided with a series of longitudinally disposed diverging ribs extending from its cutting edge toward the rear edge thereof, and intermediate channels or coves between said ribs gradually decreasing in depth from the cutting edge of the mold-board toward the rear thereof; said ribs gradually narrowing in width from the cutting edge toward the rear of the mold-board and said channels or coves gradually increasing in width from the cutting edge toward the rear of the mold-board, and removable cutting points at the front ends of the ribs.

In testimony that I claim the foregoing as my own, I affix my signature in presence of two witnesses.

JUNIUS F. WHITING.

Witnesses:
RAYMOND T. McINTIRE,
PAUL C. LAYBOURN.

---

Copies of this patent may be obtained for five cents each, by addressing the "Commissioner of Patents, Washington, D. C."